UNITED STATES PATENT OFFICE.

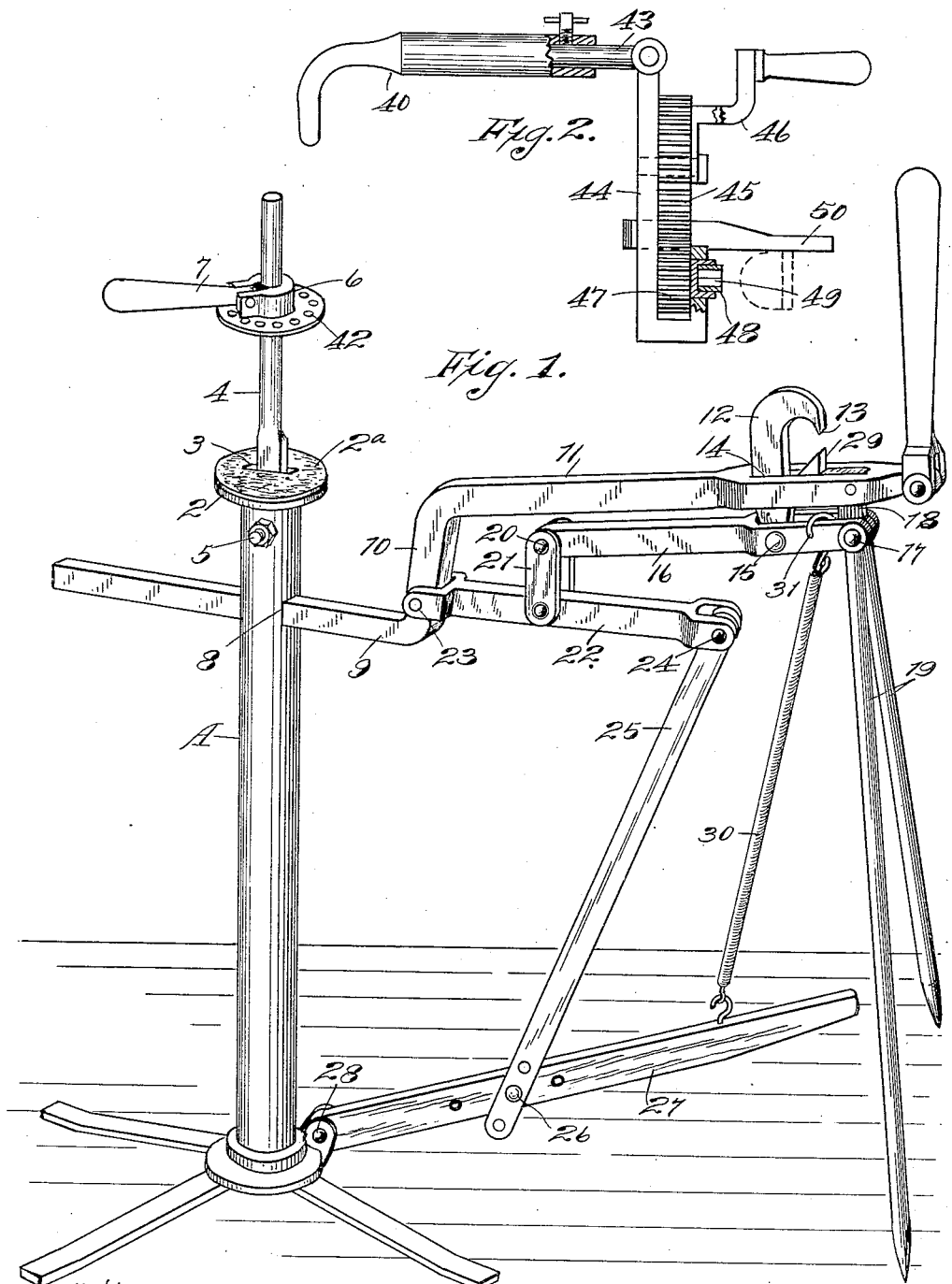

JOSEPH J. CASEY, OF RENO, NEVADA.

MACHINE FOR SEVERING BOLTS AND NUTS OF VEHICLE-WHEELS.

1,054,172. Specification of Letters Patent. Patented Feb. 25, 1913.

Application filed April 30, 1912. Serial No. 694,096.

*To all whom it may concern:*

Be it known that I, JOSEPH J. CASEY, a citizen of the United States, residing at Reno, in the county of Washoe and State of Nevada, have invented new and useful Improvements in Machines for Severing Bolts and Nuts of Vehicle-Wheels, of which the following is a specification.

This invention relates to a simple, substantial and widely adjustable machine which may be used to remove nuts or bolts by which tires are fastened on wheels.

The object of the present invention is to provide a device whereby nuts and bolts used to fasten tires on wheels may be easily and rapidly severed, thereby eliminating the use of wrenches and other tools and gaining a great saving in time in these operations.

The invention consists of the parts and the construction and combination of parts as hereinafter more fully described and claimed, having reference to the accompanying drawings in which—

Figure 1 is a perspective view of the nut or bolt cutting machine. Fig. 2 is a detail view showing a bolting mechanism attachable to the machine.

Many wheels have their tires secured to the felly by means of bolts having nuts which are screwed tight up against washers bearing on the inner surface of the felly. When it is desired to remove the tire, wrenches are sometimes used to unscrew the nuts and often chisels are used to break away the bolts or nuts.

The present invention is evolved with the particular object in view of more quickly severing the connecting bolts or the nuts of the same so that the tire can be removed in much less time and with less labor.

In its illustrated embodiment, my invention comprises a suitable standard A which may be tubular or of other form of suitable length; the lower end being provided with supporting legs which may be attached to a floor or other support, if desired, and the upper end of the standard is provided with an annular table or flange 2, appropriately connected or secured to the top of the standard. The flange 2 has an oblong slot 3, through which projects a spindle or rod 4, the lower portion of which is flattened and passes through the oblong slot 3 in the flange 2; the lowermost end of the spindle or rod 4 being provided with an eye through which may be passed a bolt 5 extending through the standard A.

The upper surface of the table or bearing 2 may be provided with leather or other suitable soft material 2ª, upon which a wheel hub will rest when it is passed downwardly over the upright rod 4; the latter having a free, oscillating movement in the slot 3 on its pivot 5. After a wheel has been passed over the rod 4 an adjustable flanged clamp 6 is adjusted above the upper portion of the hub and locked by a suitable clamp lever 7; the flange collar 6 acting to steady the wheel as it rests upon the support 2.

At a suitable distance below the top of the support or standard A there is formed a transverse rectangular slot 8, through which may be longitudinally adjusted a beam 9 which is bent angularly upward, as at 10, and thence again at 11 outwardly away from the standard A; the outwardly extending portion 11 of the beam 9 inclining slightly upward from the horizontal.

Adjacent to the outer end of the beam 9 there is provided a movable cutter 12, of suitable proportions, having a cutting edge 13; the cutter being slidably mounted in a guide or slot 14 formed for its reception in the beam, and the lower end of the cutter 12 being pivotally connected at 15 to a lever 16, the outer end of which is fulcrumed upon a bolt or other pivot 17 which is mounted in a depending ear or lug 18 fastened in the beam extension 11 at a point beyond the cutter 12. Also pivoted on the bolt 17 is a pair of angularly adjustable supporting-rods or braces 19, the lower ends of which rest upon the floor or other surface on which the machine is stationed.

The inner end of the lever 16, which is connected to the movable jaw or cutter 12, is pivotally connected by bolts 20, and links 21 to a second operating lever 22, one end of which is fastened by a bolt or other suitable device 23 adjacent to the angular extension 10 of the beam 9. The outer end of the secondary lever 22 is connected by a bolt 24 to the upper end of a link 25; the latter being pivoted by an adjustable bolt 26 to a foot-lever or treadle 27. The treadle 27 is fulcrumed at 28 adjacent to the base of the standard A.

Disposed just below the cutting edge 13 of the tool 12 and rigidly secured adjacent to the outer end of the beam extension 11, is a stationary cutter or die 29 toward which the cutting edge 13 of the cutter 12 will move when pressure is applied to the foot-lever 27; this normally being supported in an upward position by a contractile spring 30, the lower end of which is connected to the foot-lever 27 and the upper end of which has a hook 31 snapped over the lever 16 adjacent to its fulcrum 17. The tension of the spring 30 normally spreads or opens the jaw 12 relative to the stationary cutter 29.

In operation when bolts or nuts are to be severed from a wheel, the latter having been arranged with its hub surrounding the upright 4, the operator rotates the wheel to bring a bolt between the cutting edges of the cutters 12—29; the main beam 9 having been properly adjusted longitudinally so as to bring the felly of the wheel with such relation to the cutters that the bolt will swing between the cutters into position at the point where it is desired to sever the bolt. Having thus positioned the wheel, the operator firmly clamps or steadies this by swinging upwardly at the outer end of the beam arm 11, a lever or pressure device 32 which can be forced against the tire of the wheel with sufficient pressure to firmly hold the wheel, at which time when pressure is applied to the foot-lever 27 the slidable jaw 12 will be drawn down and forced into and cut the nut or bolt supported upon the stationary jaw or cutter 29. In some cases it may be desired to merely split the nuts instead of severing the bolts, in which case it is manifest that the cutting edge of the cutters 12 and 29 would be arranged parallel to the axis of the bolt, the nut of which is to be split. When it is desired to cut or sever the bolt, the edges of the cutters are, of course, formed transversely to the axis of the bolt, and then when pressure is applied to bring the jaw 12 downwardly the cutters will perform their operation.

Having thus described my invention, what I claim and desire to secure by Letters Patent is—

1. A bolt and nut cutting machine, comprising a stationary standard having a hub-supporting portion, a radial beam adjustable in the standard and supported at its outer end, cutting knives, one of which is mounted fixedly on the outer end of the radial beam, and the other of which is slidably mounted in the beam and movable toward the stationary cutter, and a compound lever mechanism, one member of which is pivoted adjacent to the outer end of the radial beam and which member is pivotally connected to the movable cutter.

2. A bolt cutting apparatus, including a stationary standard having a seat formed upon its upper end to support the hub of a wheel, a spindle pivoted in the upper end of the standard and adapted to project through the hub, a beam radially adjustable in the standard supported on its outer end on adjustable legs, a stationary cutter fixed adjacent to the outer end of the beam, a slidable cutter movable through the beam toward and from the fixed cutter, and a mechanism for reciprocating the movable cutter.

3. A bolt cutting apparatus, including a stationary standard having a seat formed upon its upper end to support the hub of a wheel, a spindle pivoted in the upper end of the standard and adapted to project through the hub, a beam radially adjustable in the standard supported on its outer end on adjustable legs, a stationary cutter fixed adjacent to the outer end of the beam, a slidable cutter movable through the beam toward and from the fixed cutter, a mechanism for reciprocating the movable cutter, and a clamp lever fulcrumed on the outer end of the radially adjustable beam and adapted to be pressed against the tire of the wheel, the hub of which may be supported upon the upper end of the standard.

4. A nut and bolt cutting machine, including a vertical standard having a flange at the top and a spindle pivoted to oscillate therethrough, a plate slidable on the spindle and a locking clamp therefor, an angular beam slidable transversely through the standard, slotted at the outer end and having a cutter fixed therein, an opposing hook-shaped cutter slidable through the slot, a lever fulcrumed beneath the beam, to which lever the shank of the hook-shaped cutter is pivoted, a second lever fulcrumed to the angular bend of the beam, links connecting the two levers, a treadle fulcrumed to the foot of the standard and connected with the end of the second lever, legs by which the outer end of the beam is supported, and a return spring connecting the treadle therewith.

5. A nut and bolt cutting machine comprising a standard with a flange, a pivoted spindle with a vertically adjustable plate and a clamp, an angular beam slidable transversely through the standard slotted at the outer end and having a fixed cutter with a hook-shaped companion cutter slidable through the slot, a compound lever mechanism, the members of which are respectively fulcrumed adjacent to the outer end, and the angular portion of the beam, a treadle connected to the second lever, legs supporting the outer end of the beam, and a clamp fulcrumed to the outer end of the beam coacting with the clamp upon the standard to guide and steady the wheel.

6. A nut and bolt cutting machine comprising a vertical, flanged standard, a spindle pivoted and turnable therein and a holding plate and clamp, an angular beam slidable radially through the standard, the outer end being substantially level with the flange of the standard, adapted to support the felly of a wheel, and a lever adapted to clamp against the wheel rim, a stationary cutter fixed to the beam inside the line of the felly, a co-acting hook-shaped cutter having its shank slidable through the slotted end of the beam, interior to the fixed cutter, legs upon which the outer end of the beam is supported, a compound lever having its members fulcrumed to the beam interior to the circumference of the wheel, and a treadle with which said lever system is connected, said lever having its fulcrum at the base of the central standard.

In testimony whereof I have hereunto set my hand in the presence of two subscribing witnesses.

JOSEPH J. CASEY.

Witnesses:
  THOS. H. CURNOW,
  R. L. GRITTON.

Copies of this patent may be obtained for five cents each, by addressing the "Commissioner of Patents, Washington, D. C."